US006788353B2

(12) United States Patent
Wredenhagen et al.

(10) Patent No.: US 6,788,353 B2
(45) Date of Patent: Sep. 7, 2004

(54) SYSTEM AND METHOD FOR SCALING IMAGES

(75) Inventors: Finn Wredenhagen, Toronto (CA); Gary Cheng, Scarborough (CA); Soo Jang, Simcoe (CA); Lance Greggain, Woodbridge (CA)

(73) Assignee: Pixelworks, Inc., Tualatin, OR (US)

( * ) Notice: Subject to any disclaimer, the term of this patent is extended or adjusted under 35 U.S.C. 154(b) by 315 days.

(21) Appl. No.: 09/948,819

(22) Filed: Sep. 10, 2001

(65) Prior Publication Data

US 2002/0057362 A1 May 16, 2002

(30) Foreign Application Priority Data

Sep. 8, 2000 (CA) ............................................. 2317870

(51) Int. Cl.[7] .............................. H04N 9/74; H04N 7/01; H04N 5/21
(52) U.S. Cl. ........................ 348/581; 348/441; 348/607; 348/619
(58) Field of Search ................................ 348/441, 446, 348/448, 607, 578, 581, 619, 620, 580; 382/260, 261, 266, 298, 299, 300; H04N 7/01, 9/74, 11/20

(56) References Cited

U.S. PATENT DOCUMENTS

| | | | |
|---|---|---|---|
| 5,241,372 A | * | 8/1993 | Ohba ......................... 348/578 |
| 5,369,735 A | * | 11/1994 | Thier et al. .................. 348/580 |
| 5,793,435 A | | 8/1998 | Ward et al. |
| 5,929,918 A | | 7/1999 | Marques Pereira et al. |
| 5,943,099 A | | 8/1999 | Kim |

OTHER PUBLICATIONS

Ford, G.E., Space Scale Analysis for Image Sampling and Interpolation, ICASSP-92: 1992 IEEE Intl. Conference on Acoutics, Speech & Signal Processing; San Francisco, CA; IEEE (92CH3103), pp. 165–168 vol. 3, Mar. 1992.

* cited by examiner

*Primary Examiner*—Sherrie Hsia
(74) *Attorney, Agent, or Firm*—Marger Johnson & McCollom, PC

(57) ABSTRACT

A system and method are provided for calculating a target pixel for scaling an image comprising a plurality of source pixels. A contour is determined in the image using at least one of a first set of predetermined parameters. A filter tap configuration is adaptively selected from a predefined set of filter tap configurations in accordance with the determined contour. The predefined set of configurations includes a plurality of non-linear filter tap configurations. The target pixel is calculated by selectively convolving ones of the plurality of source pixels along a locus of the selected filter tap configuration with a weighting factor, and combining the convolved pixels.

11 Claims, 7 Drawing Sheets

SYSTEM AND METHOD FOR SCALING IMAGES

The present invention relates to a method for deinterlacing and scaling interlaced images, as well as scaling progressive scanned and computer generated images.

BACKGROUND OF THE INVENTION

Interlaced video is transmitted on a field-by-field basis, where each field contains one half of the image content. An image can be separated into two halves, wherein the first half comprises alternating rows starting with the first row (the odd field) and the second half comprises alternating rows starting with the second row (the even field). A scanner at an image scene captures the even lines in the image scene and transmits them. The scanner then captures the odd lines in the image scene and transmits them. The even and odd fields are typically not from the exact same image scene, but are temporally displaced. The temporally displaced even and odd fields are received and displayed on an interlaced monitor. An interlaced monitor is designed to display these fields one after another in a manner that is consistent with the way they were generated.

The terms, current field (CF) and previous field (PF) are used to denote fields that are temporally adjacent, whether they are even or odd. The current field either lags or leads the previous field. If the previous field is even, then the current field is odd and visa-versa.

In North America, interlaced signals have been broadcast using the National Television Standards Committee (NTSC) television format. Recently, standards have been adopted for the transmission of signals to be displayed on progressive scan display devices as well as on larger interlaced formats. Progressive scan devices display the even and odd fields as though there is no temporal displacement between them.

The problem with converting an interlaced image sequence to a progressive sequence is a challenging one. If the conversion is done improperly, visual artifacts appear that are displeasing to a human observer. Deinterlacing requires rendering (or interpolating) the missing field. Several approaches have been implemented in attempts to achieve this goal.

One approach to deinterlacing interlaced fields for display on a progressive monitor is to ignore the temporal latency and "jam" the odd field together with The even field, which are then displayed on the screen. This process is referred to as field meshing. Field meshing works well when an image is static, but performs poorly when there is a visibly significant structure, such a line or an edge, in the image that is in motion. For example, a vertical line that is moving horizontally across the image will appear broken, as there is a temporal displacement between the adjacent and current fields equal to the physical displacement the line undergoes in the horizontal direction in $1/60^{th}$ of a second.

An alternate approach to deinterlacing is referred to as line doubling. Line doubling is a process whereby lines in the current field are duplicated in the previous field. The duplicate lines are subsequently displayed on the progressive display device. However, line doubling can cause a loss of detail in the image. Improvements on creating an previous field from a current field can be achieved using a filter to interpolate the current field to produce the previous field data. However, this improvement still ignores all the previous field data, much of which may be spatially relevant.

Traditionally, resizing an image has been done using linear techniques. A finite impulse response (FIR) filter is used to compute a target image. The target image is either larger or smaller in size than the source image. The source image is convolved with the filter to create The output image. Unfortunately, the end result is not often visually satisfactory because linear filters cannot faithfully reproduce, or preserve, the high contrast structures such as edges in many images that are graphically generated by a computer.

For instance, using a linear filter which is "sharp", that is it has significant high frequency gain, will result in a target image that is prone to exhibit "ringing". This type of phenomenon is called the Gibbs effect. The Gibbs effect manifests itself visually as a visual echo or visual ripple that surrounds the structure in question.

Alternatively, if the filter is too "soft", that is it has more high frequency attenuation, the resulting target image will transform structures so that they are perceived as blurry. Neither a soft nor a sharp linear filter is adequate.

It is an object of the present invention to obviate or mitigate at least some of the above mentioned disadvantages.

SUMMARY OF THE INVENTION

In accordance with an aspect of the present invention there is provided a method of calculating a target pixel for scaling an image comprising a plurality of source pixels. The method includes the following steps. A contour is determined in the image using at least one of a first set of predetermined parameters. A filter tap configuration is adaptively selected from a predefined set of filter tap configurations in accordance with the determined contour. The predefined set of configurations includes a plurality of non-linear filter tap configurations. The target pixel is calculated by selectively convolving ones of the plurality of source pixels along a locus of the selected filter tap configuration with a weighting factor, and combining the convolved pixels.

In accordance with yet another aspect of the present invention there is provided a system for calculating a target pixel for scaling an image comprising a plurality of source pixels. The system comprising the following components. A plurality of calculation units for calculating values for a first set of predetermined parameters. A filter selector for selecting a filter tap configuration from a set of filter tap configurations in accordance with the fist set of predetermined parameters. The set of filter tap configurations includes non-linear filter tap configurations. A convolution unit for convolving selected ones of the plurality of source pixels along a locus of the selected filter tap configuration with predetermined weighting factors. An output for combining the convolved pixels for calculating the target pixel.

BRIEF DESCRIPTION OF THE DRAWINGS

An embodiment of the invention will now be described by way of example only with reference to the following drawings in which.

DETAILED DESCRIPTION OF THE PREFERRED EMBODIMENT

Figure 1A:
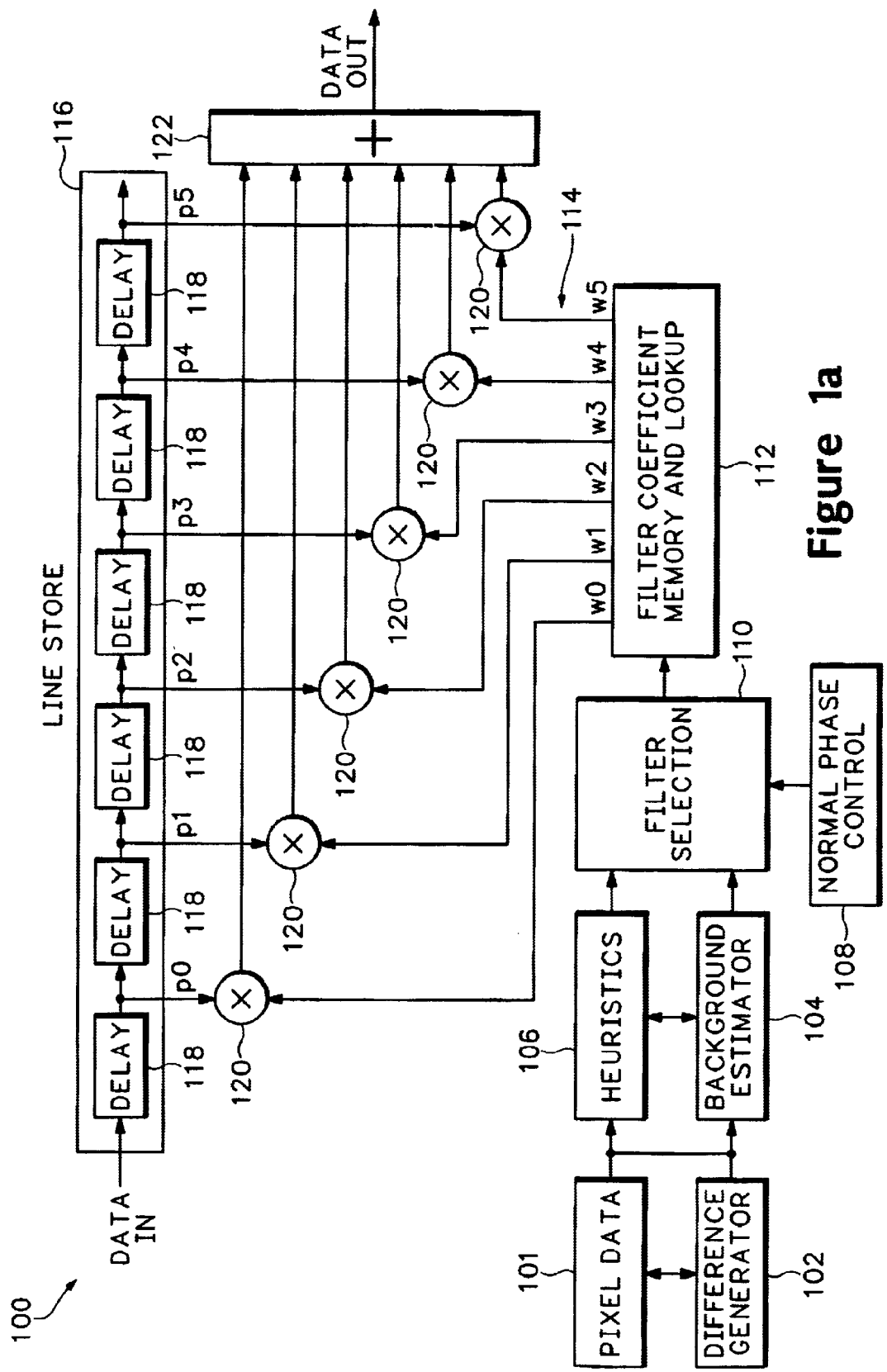
FIG. 1a is a block diagram of a horizontal scaler.

For convenience, like numerals in the description refer to like structures in the drawings.

Figure 1B:
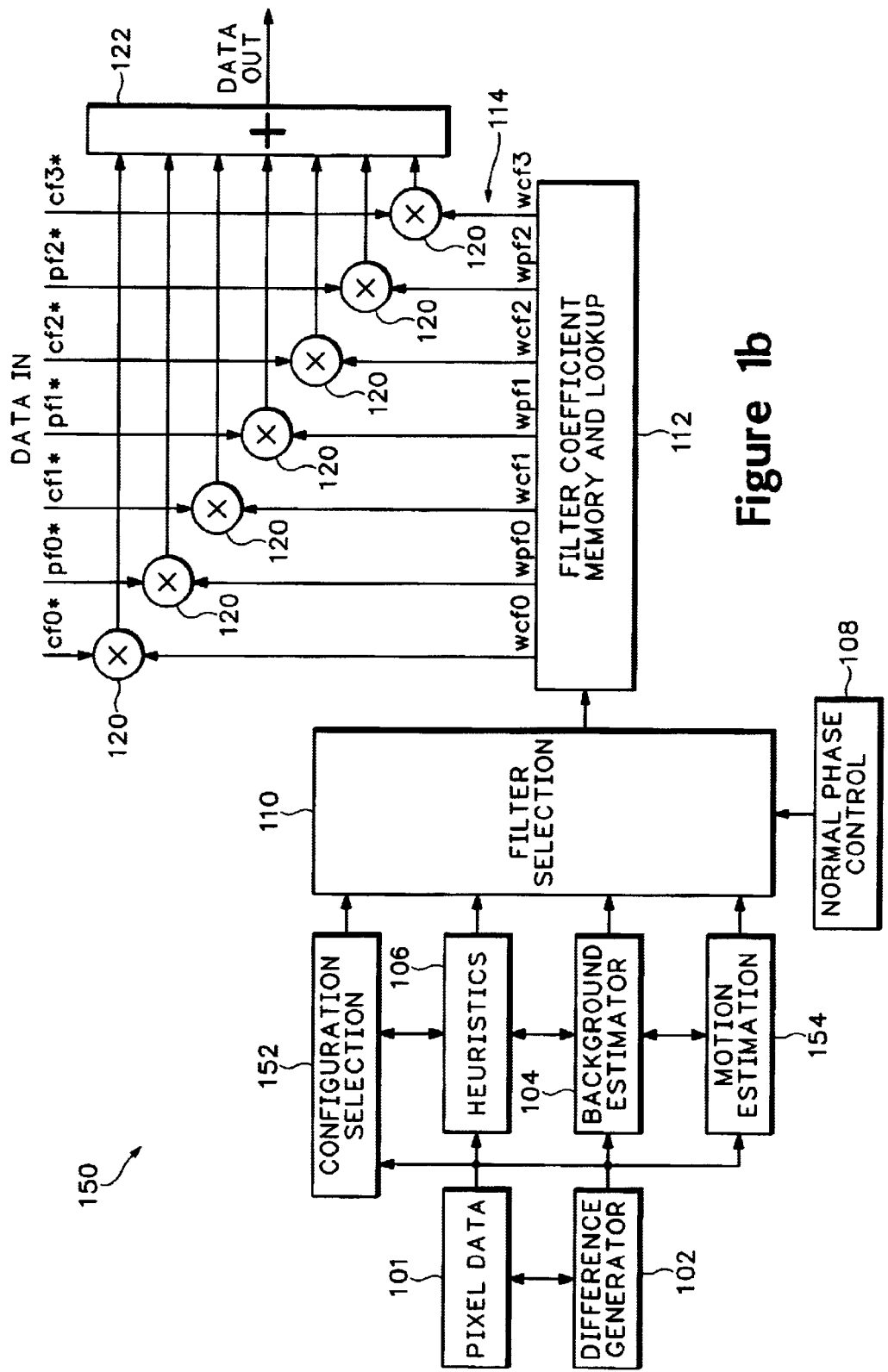
FIG. 1b is a block diagram of a vertical scaler.

Referring to FIGS. 1a and 1b, block diagrams illustrating a system for horizontally and vertically scaling an image are represented generally by the numeral 100 and 150, respectively. The systems 100 and 150 facilitate scaling by calculating a target pixel based on available pixel data from the pre-scaled image.

Referring to FIG. 1a, a horizontal scaler 100 is shown. Pixel data 101 is coupled to a difference generator 102, a background estimator 104, and a heuristics unit 106 for providing information regarding an image to be scaled. The heuristics unit 106, the background estimator 104, and a phase control unit 108 are coupled with a filter selector 110. The filter selector 110 is, in turn, coupled with a filter coefficient memory 112, which includes a plurality of filter coefficient output lines 114. Pixel data 101 is also provided to a line store 116 comprising a plurality of delay elements 118. The delay elements 118 function as a shift register for shifting in appropriate pixel data 101. Outputs of the delay elements 118 are operatively coupled with selective ones of the filter coefficient output lines 114 via a convolution unit 120. The output of the convolution unit is coupled to a combiner 122, the output of which is the target pixel.

Generally, a pixel is interpolated in accordance with several parameters in a surrounding neighbourhood of pixels. This neighbourhood is referred to as the region of interest (ROI). The heuristics unit 106 determines some of the parameters for interpolating the target pixel, including structures within the region of interest, the presence of noise, image intensity, color and hue, and local surface properties. A further parameter, an estimate of the background intensity, is calculated by the background estimator 102. The phase control unit 108 provides phase control to the filter selector 110 according to predetermined user conditions as is standard in the art.

The filter selector 110 uses the above mentioned parameters for determining an appropriate filter for interpolating the target pixel. The filter selector 110 also uses the parameters for determining an appropriate set of coefficients (or weights) for applying to different pixels during filtering. The filter selector 110 looks up the filter coefficients in the filter coefficient memory 112. Generally, the coefficients are stored in the form of a lookup table. Each of the filter coefficients is output to an appropriate filter coefficient output line 114 where they are convolved with a corresponding pixel from the region of interest. The convoluted pixels are combined at the combiner 122 for producing the desired target pixel.

Referring to FIG. 1b, a vertical scaler 150 is shown. Pixel data 101 is coupled to the difference generator 102, the background estimator 104, and the heuristics unit 106 for providing information regarding an image to be scaled, The vertical scaler 150 further includes a configuration selector 152 and a motion estimator 154. The heuristics unit 106, the background estimator 104, configuration selector 152, the motion estimator 154, and the phase control unit 108 are coupled with the filter selector 110. The filter selector 110 is, in turn, coupled with the filter coefficient memory 112, which includes a plurality of filter coefficient output lines 114. Pixels from different rows are operatively coupled with selective ones of the filter coefficient output lines 114 via a convolution unit 120. The output of the convolution unit 120 is coupled to a combiner 122, the output of which is the target pixel.

As with the horizontal scaler 100, the heuristics unit 106 determines a plurality of parameters for interpolating the target pixel. Similarly, the background estimator 104 provides an estimate of the background intensity. Furthermore, the configuration selector 152 uses the above mentioned parameters for selecting from a plurality of vertical filter tap configurations, including non-linear configurations. Once the tap configuration is selected, the pixels within the locus of the tap configuration are used for calculating the target pixel. Also, the motion estimator 154 provides an estimate of motion between the temporally displaced current and previous fields. The estimated motion provides a further parameter for selecting a filter tap configuration, a filter, and filter coefficients.

Figure 2:
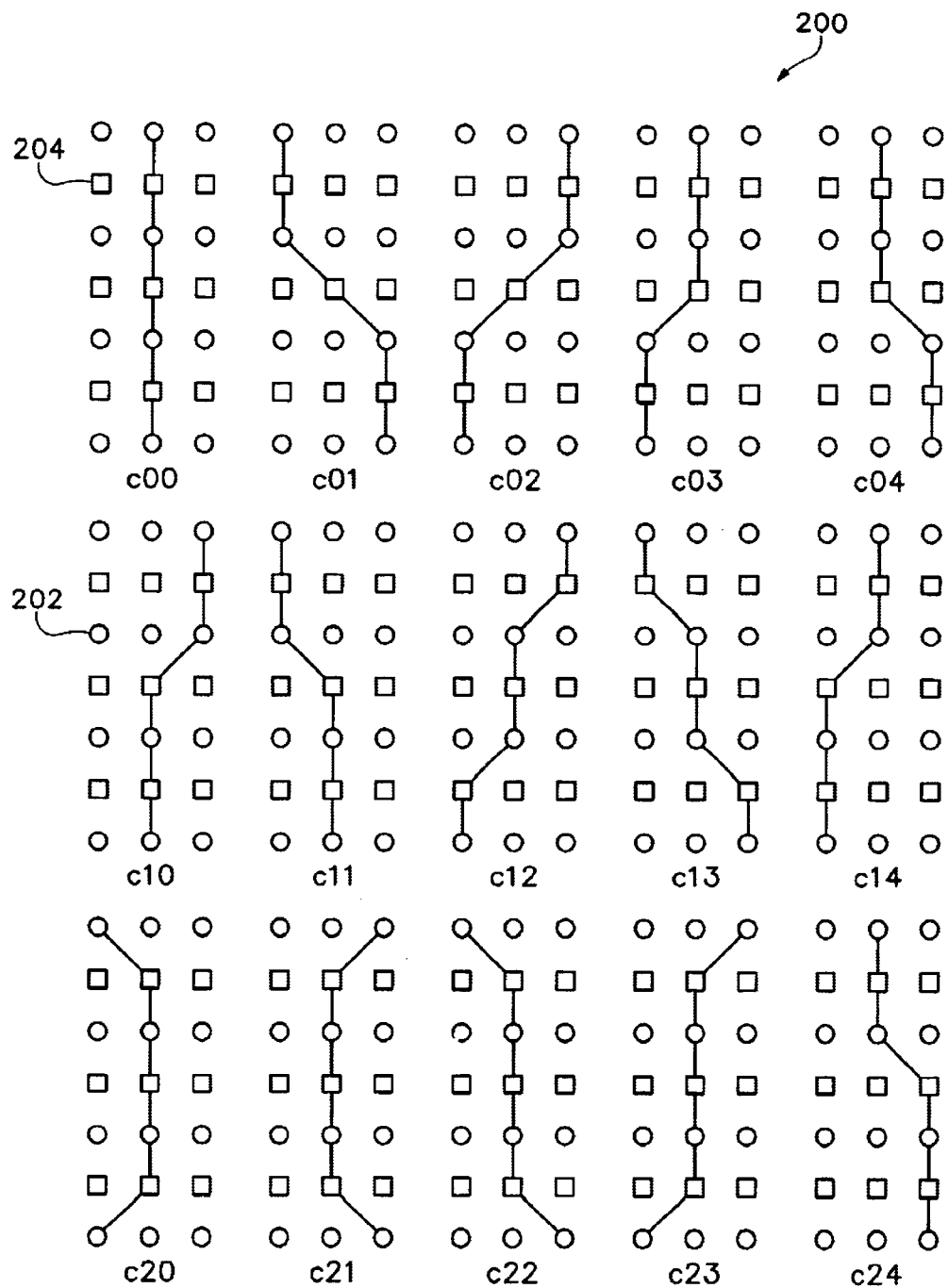
FIG. 2 is a schematic diagram of a plurality of sample filter tap configurations.

As previously mentioned, pixels from different rows are coupled with the filter coefficient output lines 114. The pixels are selected in accordance with the selected filter tap configuration. Referring to FIG. 2, examples of 25 possible filter tap configurations, labeled c00 to c24, are represented generally by the numeral 200. A pixel from each row is convolved with a corresponding filter coefficient. The convolved pixels are combined at the combiner 122 for producing the desired target pixel.

The components discussed above are described below in greater detail.

Selecting a Tap Configuration

An algorithm for enhancing the quality of scaling and deinterlacing an interlaced image is described with reference to FIGS. 1a and 1b. Referring to FIG. 2 a section of an interlaced screen comprising a plurality of possible filter tap configurations is illustrated. For the purposes of this description, the oval shapes 202 represent a portion of the even lines and the square shapes 204 represent a portion of the odd lines. (Alternately, the oval shapes and the square shapes may correspond to the odd lines and the even lines, respectively.) For each configuration, a line passing through the pixels indicates a locus of current and previous field pixels that are selected as source pixels to compute the target pixel. The line passing through the pixels may be linear, but is preferably non-linear.

The non-linear tap configurations provide flexibility in the way the target pixel is computed during interpolation by altering the selection of the source pixels. Such flexibility enables structures in the image, such as lines and edges, to be followed in such a way that they are preserved better than using pure vertical and horizontal filtering. Each target pixel is calculated using a configuration that provides the best result for it.

Determining Structures

Figure 3:
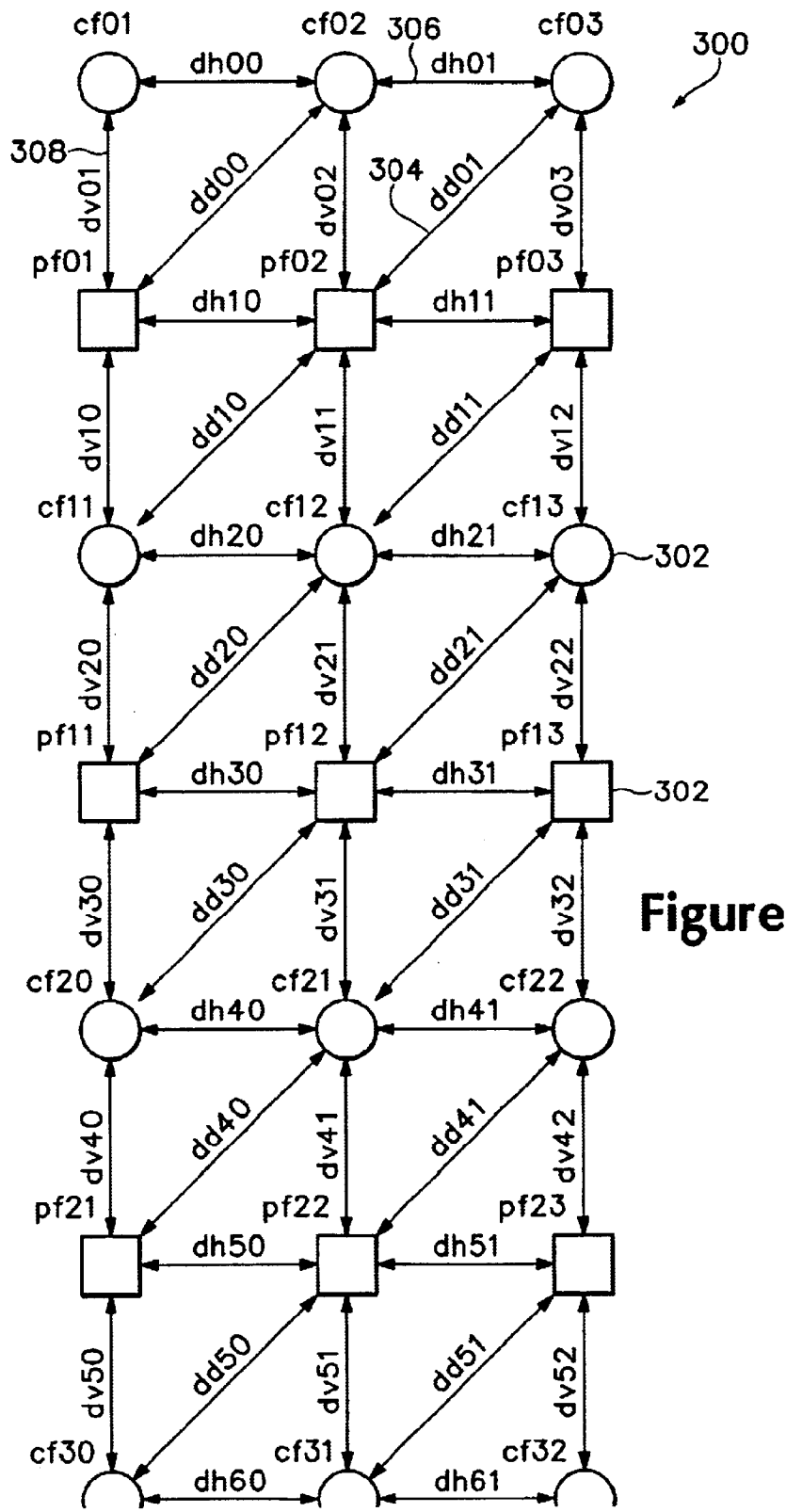
FIG. 3 is a schematic diagram illustrating various differences between pixels.

As previously mentioned, it is preferable to follow an edge or a contour of a structure outline for determining a tap configuration. Referring to FIG. 3, an example of a region of interest (ROI) is represented generally by the numeral 300.

Arrows illustrate various differences between pixels 302 in the ROI. Diagonal arrows 304 illustrate a diagonal difference (dd), horizontal arrows 306 illustrate a horizontal difference (dh), and vertical arrows 308 illustrate a vertical difference (dv). Generally, the diagonal difference is taken between a first pixel and a second pixel that is located above and to the right of the first pixel.

Each difference is further identified by a two-digit suffix indicating the position of the difference. For the example, the first horizontal different is dh00. The vertex for this co-ordinate system is the upper left most pixel in the ROI. The first diget of the suffix is incremented for each row of differences and the second digit of the suffix in incremented for each column of differences. Therefore, for example, the horizontal difference between the first and second pixels in the first row is indicated by dh00, between the second and third pixels in the first row is indicated as dh01, and between the first and second pixels in the second row is indicated by dh10. Similarly, the vertical difference between the first and second pixels in the first column is indicated by dv00, between the second and third pixels in the first column is indicated as dv10, and between the first and second pixels in the second column is indicated by dv01. Similarly, the diagonal difference between the first pixel in the second row and the second pixel in the first row is indicated by dd00 and the diagonal difference between the second pixel in the second row and the third pixel in the first row is indicated by dd01.

The pixel differences are quantized (Q) to have a sign bit and a magnitude. The number of bits assigned the magnitude is programmable. Using the quantized difference information between pixels, it is possible to discern properties in the image such as direction, the presence of lines or edges, and noise.

Programmable rules are encoded into the configuration selector and are used for detecting the presence of a structure such as an edge. For example, using the differences computed by the difference generator, a vertical edge is defined as follows:

$$Q(dh00)=Q(dh01)=Q(dh10)=Q(dh11)=Q(dh20)=Q(dh21)=Q(dv01)=Q(dv10)$$

and $$Q(dh30)=Q(dh31)=Q(dh40)=Q(dh41)=Q(dh50)=Q(dh51)=Q(dh60)=Q(dh61)=Q(dv30)=Q(dv40)=Q(dv50)$$

and $$Q(dv20)>T \text{ and } Q(dv21)>T \text{ and } Q(dv22)>T$$

Therefore, if the above condition is true, a vertical step of height T, or greater, is present between the third horizontal row from the top and the fourth horizontal row from the top.

The various differences calculated by the difference machine are also used for determining image properties such as surface gradient, direction information, correlation between rows and columns, and whether or not noise is present in the image. The directional information can be made on a row-by-row or column-by-column basis. The above mentioned properties are determined from the various pixel differences using rules such as the one described above. Such rules will be apparent to a person skilled in the art upon review of this description.

Furthermore, pixel intensities are also available for use by the configuration selector (as is described in detail below). Thus, decisions can be made using the pixel intensities as well as the difference between pixels. This allows different decisions to be made even if the pixel differences are the same.

Noise

Let $F_{1e}$, $F_{1o}$, $F_{2e}$, $F_{2o}$ be successive interlaced fields that are alternatively even and odd. The inter-field difference between two even and two odd fields respectively is:

$$\Delta Fe = F_{2e} - F_{1e};$$

and $$\Delta Fo = F_{2o} - F_{1o}.$$

on a pixel-by-pixel basis. The results of the differences provide two arrays of data that are used to compute an estimate of both motion and temporal noise.

Temporal noise is noise that is present when the scene is deemed static, but the values of $\Delta Fe$ and $\Delta Fo$ are non-zero. This type of noise is often referred to as salt and pepper noise because of its visual appearance. Given the values of $\Delta Fe$ and $\Delta Fo$, it is possible to estimate the amount of salt and pepper noise in the image scene. A noise estimate is formed by counting the number of pixels deemed static, that is, below a static threshold $T_s$.

Noise thresholds $T_{n0}$ and $T_{n1}$ are either predetermined or generated dynamically. When compared with the values of $\Delta Fe$ and $\Delta Fo$, the noise thresholds, $T_{n0}$ and $T_{n1}$, are too small to be considered motion. Therefore, pixels that have a value below the static threshold, $T_s$, but between the noise thresholds, $T_{n0}$ and $T_{n1}$, are considered to be noisy. The frequency of the incidences of the noise threshold is fed back into adaptive threshold logic. Further, source pixels in the image that are excessively noisy and could detract from the quality of the resultant processed image can be avoided by selecting a tap that excludes the noisy pixels.

Image Intensity, Colour, and Hue

A boundary defines a structure and belongs to part of the image having the same intensity, color, or hue. Pixel intensities that belong to such a grouping are of equal height and thus are considered level sets. Following level sets in the image is useful to preserving the structure of an image. Linear operation of convolution can soften edges, especially if the filter orientation is such that its taps lay across a structure boundary such as an edge. Therefore, orienting the filter taps in the direction of the edge, rather than across it, helps to preserve the edge.

Background Intensity

Knowledge of the background in the region of interest about the interpolated target pixel is useful as it helps to resolve some of the ambiguity that can arise during the selection of a filter tap configuration. Knowledge of the background also helps to resolve ambiguities in the interpolation and decimation of high contrast images. When text is tightly spaced, so that there is only a one or two pixel separation between characters, or perhaps between and character and an underline, it is often ambiguous whether to extend the character, or to fatten the line. Moreover, it can happen that both the character and the line are altered in such a way that neither boundary appears straight. Knowledge of the background is used for extending, or not extending, a non-background color in a consistent way.

Figures 5, 6:
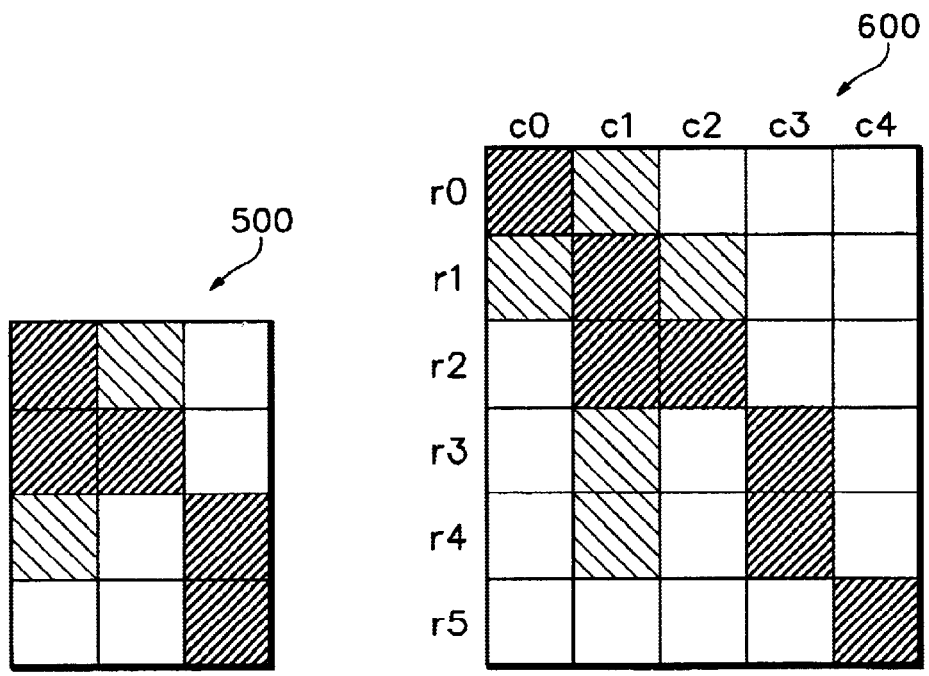
FIG. 5 is a block diagram of a region of interest wherein the background colour assists determining filter properties.
FIG. 6 is a block diagram of a window of interest for the region of interest illustrated in FIG. 5.

Referring to FIG. 5, a 4 by 3 array of pixels that corresponds to a section of a larger image is represented generally by the numeral 500. The section shows a three-colour pattern containing a possible structure. If the task is to preserve the structure, it is not clear whether it is needed to preserve (or emphasize) black, white or gray. Disregarding the structure in the image could lead to a blurring of the edges when a filter is convolved with the source image. This problem is difficult to solve without knowledge of the background, If the background is white, the black should be preserved during interpolation, and vice versa, so that the structure is preserved. Therefore, the non-background color does not inadvertently become detached from other non-background pixels.

The pattern of pixels shown in FIG. 5 has been chosen to illustrate the fact that directional interpolation based on gradient values alone can sometimes be ambiguous. In general, the background is context dependent and it is difficult to know, a priori, the best window size over which the background should be estimated. The difficulty arises because the background depends on the size of the structure that is being preserved. Therefore, for a given region of interest the background intensity is defined as the intensity that is a majority within a window. The window used to estimate the background does not need to be the same size as the region of interest used to determine the tap configuration, and is typically larger.

Therefore, if a larger section of the image is examined the ambiguity often resolves itself. Referring To FIG. 6, a region larger than the region of interest is shown generally by the numeral 600. The larger region includes one additional row and one additional column on all sides of the region of interest and, therefore, includes the region of interest. Examining the larger region clearly identifies the background color and, more importantly, the structure that is to be preserved. In this example the structure is a dark line passing through a region dominated by white pixels.

Further, using the background information, it is preferable that when interpolating between the pixels in row 3, column 3 and row 4, column 3, that the pixels in row 2, column 2 and row 5, column 4 are used according to configuration cl3 (as shown in FIG. 1).

For a given window size and using the definition of background above, a frequency profile (histogram) is built over a sliding window of height N and width M, denoted as W(N,M). The background is the intensity with the greatest frequency in W(N,M). We will refer to W(N,M) as the window of interest (WOI).

Figure 7:
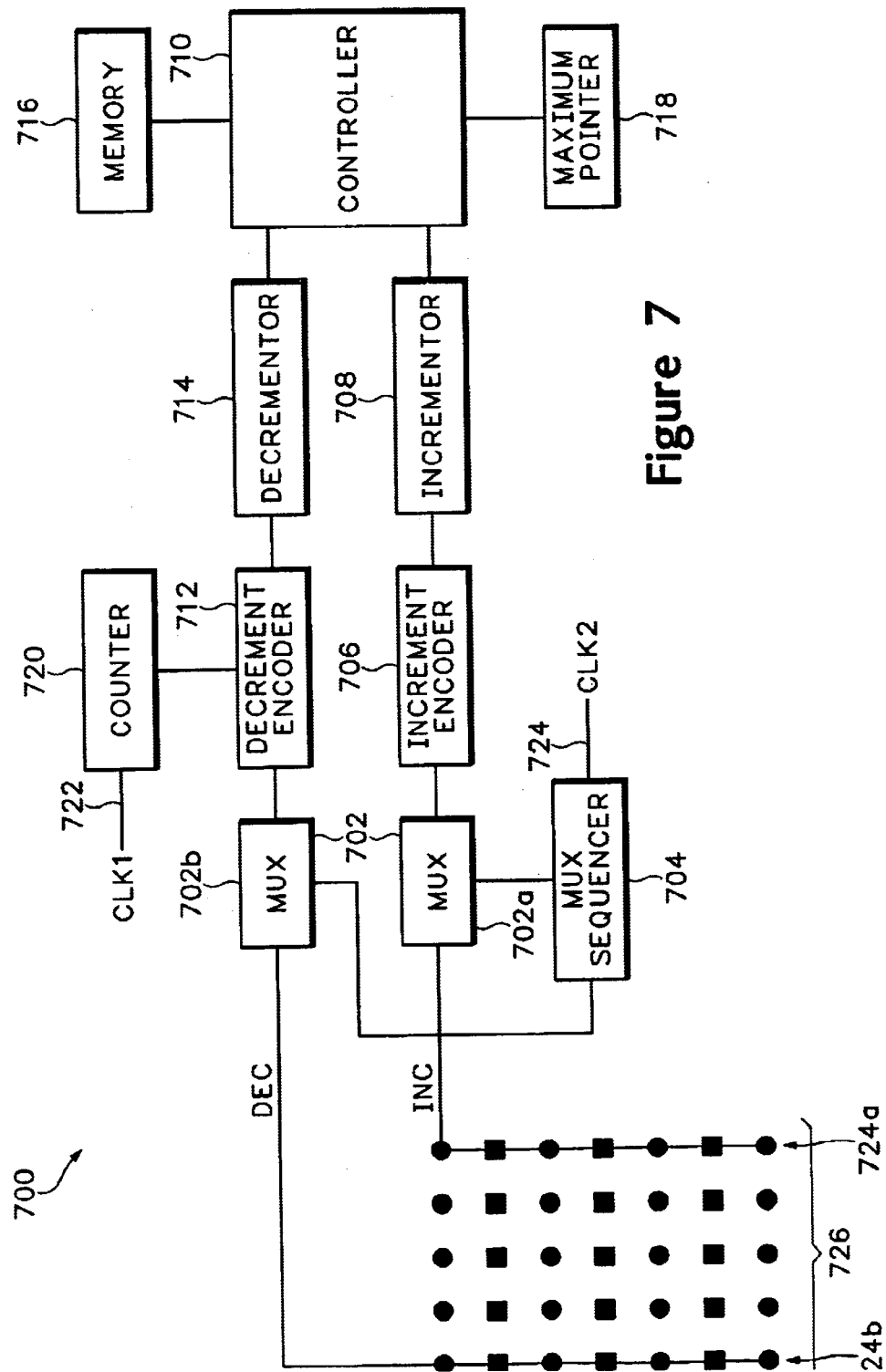
FIG. 7 is a schematic diagram of a background selection circuit.

Referring to FIG. 7, a circuit diagram illustrating a background determination circuit is represented generally by the numeral 700. The circuit includes a pair of multiplexors 702 for receiving input and a multiplexor sequencer 704 for alternately switching between the multiplexors. A first multiplexor 702a is coupled to an increment encoder 706, which is coupled to an incrementor 708, which is, in turn, coupled to a controller 710. A second multiplexor 702b is coupled to a decrement encoder 712, which is coupled to a decrementor 714, which is, in turn, also coupled to the controller 710. The controller is further coupled to a memory 716 and a maximum pointer 718. The decrement encoder 712 is further coupled to a counter 720, which is clocked by a first clock 722. The multiplexor sequencer 704 is clocked by a second clock 724. Typically, the first 722 and second 724 clocks operate at different frequencies. The input for the multiplexors 702 are columns 724 from the window of interest 726, which is represented by an array of pixels, illustrated by alternating rows of squares and circles.

The pixel columns in the window of interest move from right to left. The rightmost column 724a of pixels represents the most recent column to be added to the window of interest and, therefore, is the input to the first multiplexor 702a. The leftmost column 724b of pixels represents the next column to be removed from the window of interest and is the input to the second multiplexor 702b.

Initially, the circuit is in a transient state since no columns have been input into the memory. Therefore, no decrementing is required and the decrementing encoder is disabled. The first clock 722 operates at the same speed it takes to update the column data. Therefore, the counter 720 is incremented until it reaches a value that is equal to the number of columns in the window of interest 726. At that point, the window of interest 726 will have been completely entered into the memory 716. The maximum pointer 718 points to the intensity that has the highest frequency in the window of interest 726, which is defined as the background colour.

Thereafter, the background is determined by decrementing the memory 716 in accordance with pixel intensities in the leftmost column 724b, shifting the columns to the left, and incrementing the memory in accordance with the pixel intensities in the newly entered column 724a.

The memory 716 is decremented as follows. The multiplexor sequencer 704 selects the second multiplexor 702b. The second multiplexor 702b reads the leftmost column 724b and provides the pixel information to the decrement encoder 712, one at a time. The second clock 724 operates at a speed fast enough to sequence through all the pixel values in a column before the column data is updated.

The decrement encoder 712 quantizes each pixel intensity as a value from 0 to 255. The decrement encoder 712 further translates the intensity value to a memory address. The memory 716 includes 256 addresses, each correlating to one of the possible pixel intensity values. A count is stored at each address for indicating how many pixels in the window of interest 726 have a pixel intensity associated with that address. Therefore, for example, if the count at an address associated with a value of 122 is equal to 3, then 3 pixels in the window of interest 726 have an intensity of 122.

The decrementor 714 receives the memory address from the decrement encoder 712 and sends it to the controller 710. The controller 710 receives the count stored at the selected memory address and provides it to the decrementor 714. The decrementor 714 decrements the count by one and returns it to the controller 710. The controller 710 returns the new value of the count to the same address from which it was retrieved.

The first multiplexor 702a, increment encoder 706, and incrementor 708 work in a similar fashion to that described above. However, rather than decrement the count by one for each pixel, the incrementor 708 increments the count by one.

While an intensity histogram is being computed, the memory address that contains the maximum count (i.e.: the most pixels) is determined. The maximum pointer 716 points to the address having the maximum count. The maximum pointer 716 is tracked and updated each time values are incremented or decremented. Therefore, the intensity pointed to by the maximum pointer 716 is the pointer to the background intensity at any given time.

Surface Direction

Directional information is also used for assisting with determining the tap configuration That is, in a neighborhood about the target pixel if intensity, chroma or hue in two adjacent rows of pixel data have the same directional bias, then it is possible to use such information for assisting the choice of the most appropriate tap configuration.

Figure 8:
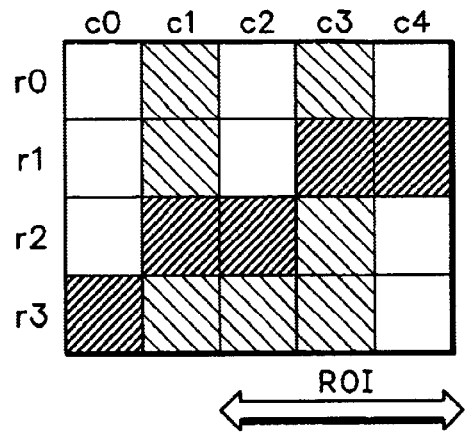
FIG. 8 is a block diagram of a region of interest wherein the surface direction assists determining filter properties.

When interpolating between rows (or columns), it is preferable not to destroy the correlation between pixels in the ROI. Consider, for example, the pixel pattern shown in FIG. 8. Suppose the target pixel to be interpolated lies halfway between pixels (row 1, column 2) and (row 2, column 2). Vertical interpolation would use configuration c00 (from FIG. 2).

However, it is more accurate to use the fact that pixels (row 2, column 0 through column 2) and pixels (row 1, column 2 through column 4) are correlated and represent a series of three pixels going from white to black. By exploiting this fact it is then possible to use configuration c02 (from FIG. 2) to generate the target pixel. The fact that portions of row 1 and row 2 have the same directional information has been used.

In order to infer the directional surface content over a larger area than the one displayed, finite state machines (FSMs) are used. State machines are used for determining the gradient in the neighborhood about the target pixel. For example, an encoder is used for encoding the gradient characteristics of the column pixel data for the rightmost column. During the next time interval, when column data is shifted towards the left, a delay unit is used for describing the vertical gradient for the center column.

In order to determine the horizontal components of the gradient, a state machine is used for monitoring pixel data in a row. As pixel data goes by, the state machine is used for characterizing the surface as going downhill, uphill or level. In addition, degrees of incline can also be determined by recording the number of successive steps above a user-defined threshold in a given direction. One such horizontal gradient state machine can be used to determine the gradient for a given row. The aggregate information from the horizontal and vertical gradients is used for determining the overall gradient in the region on interest and also helps determine the filter tap selection.

At the same time, an encoder acts on the columns in the region of interest for determining the surface trend in the vertical direction. Once the rightmost column has been encoded, it is not necessary to encode the information again. The data in the rightmost column is shifted one column to the left. The encoded information need only accompany the column data as it makes its way from the right-hand side of the region of interest to the left-hand side of the region of interest. A series of shift registers is used to pass the data along, which reduces hardware requirements.

Figure 9:
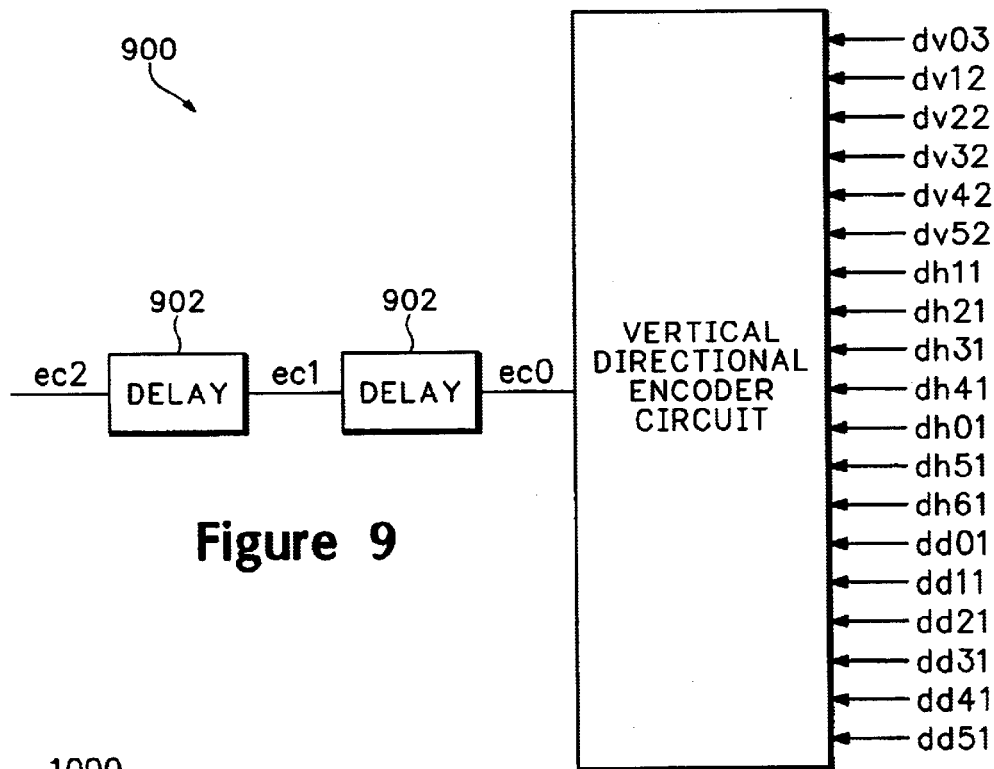
FIG. 9 is a schematic diagram of a circuit used to encode surface direction information.

FIG. 9 shows a circuit diagram for encoding the column-wise pixel data, illustrated generally by the numeral 900. The circuit also includes an associated series of shift registers 902 used for propagating the encoded information. The rightmost column is encoded at ec0. The second column receives the encoded information, which is transferred to ec1, after one clock delay. Similarly, the third encoded column at ec2 is the value of the first encoded column twice delayed.

By combining the information in the vertical and horizontal direction, it is possible to build up a picture of the surface gradient over a larger region than just the region of interest. The column-wise and row-wise directional encoding is further quantized into steep, flat, and shallow ascending or descending regions as described below. The quantization facilitates the determination of a picture of the gradient that is reasonably accurate. This information is encoded along with the other information in the source image for determining the tap configuration.

A state machine is used for determining the local trend in the window of interest. The WOI is the area over which the trend is computed. A state machine is used to indicate whether the trend is slope is downward, upward, or level. Each of these indicators is quantized so that downward may be either steep or shallow. Steep or shallow is determined relative to a threshold. A combination of pixel intensities results in the local surface being characterized by one of the symbols listed in the following table. The table is just an example to an enumeration of the gradient. Other methods of enumeration are possible and further gradient characteristics can be included.

TABLE 1

Surface direction encoder

| Symbol | Encoded Value |
|---|---|
| Ramp Shallow | 0 |
| Ramp Steep | 1 |
| Level Low | 2 |
| Level High | 3 |
| Parabolic Up | 4 |
| Parabolic Down | 5 |
| Step | 6 |

Trend information is used to help determine which pixels belong together. The state machine also allows the retention of pixel data information beyond the region of interest.

Preferably, all of the above mentioned variables are considered for the selection of a tap configuration.

Filter Characteristics

Once the configuration is determined, the filter characteristics are selected. Filter characteristics include the frequency response of the filter, including DC gain, magnitude and phase.

As previously described, filters are selected different based on inputs such as noise, edges and structures, surface characteristics, background, image intensity, colour, and hue. That is, if the image sequence is deemed noisy, a different filter is used for computing the target pixel than if the image sequence is less noisy even though the local surface pixel data is the same in both cases.

Furthermore, the filter characteristics are altered adaptively according to these and other parameters. Therefore, if the image sequence is deemed noisy, the same filter has different characteristics for computing the target pixel than if the image sequence is less noisy.

Weighting the Selected Tap Configuration

The current and previous field pixels are used to compute the target pixel in accordance with the selected tap configuration, Let $cf_{ij}$ denote the $i^{th}$ row and $j^{th}$ column of the pixel data in the current field. Let $pf_{ij}$ be the $i^{th}$ row and $j^{th}$ column of the pixel data in the previous field. Further let $wcf_i$ represent a set of filter weights associated with the current field and $wpf_i$ be a set of filter weights associated with the previous field. The two fields are combined together to form a target pixel as demonstrated by the equation below:

$$\text{Target } cf_0*wcf_0+cf_1*wcf_1+cf_2*wcf_2+cf_3*wcf_3+wpf_0*pf_0+wpf_1*pf_1+wpf_2*pf_2 \quad \text{Equation 1}$$

Subject to:

$$wcf_0+wcf_1+wcf_2+wcf_3+wcf_0+wcf_1+wcf_2=\rho \quad \text{Equation 2}$$

The symbol $cf_0$ is to be interpreted as including $cf_{00}$, $cf_{01}$ and $cf_{02}$. Similarly, $pf_0$ includes the previous field pixels in row 0, and so on.

A constant $\rho$ (the combined filter coefficient) is typically chosen to be unity so that the processed image that is output is not amplified. If $\rho$ is greater than unity, the image will become brighter, and if $\rho$ is less than unity, then image will become darker. If $\rho$ is allowed to vary, or if $\rho$ is a function of the surface characteristics of the source image, an adaptive contrast enhancement on the processed image is possible.

However, for the purpose of this description, $\rho$ is maintained to be unity. This constraint on the combined filter coefficient ρ still allows for a large degree of variability in the respective filter coefficients. That is, the unity constraint places no requirement on the individual contribution of the either the current or previous field coefficients other than the requirement that their sum is unity.

A current field scalar factor (ρcf) and an previous field scalar factor (ρpf) represent the sum of the weights used for current field and previous field processing respectively. These factors are represented by the following equations.

$$wcf0+wcf1+wcf2+wcf3=\text{pcf} \qquad \text{Equation 3}$$

$$wpf0+wpf1=\text{wpf} \qquad \text{Equation 4}$$

$$pcf+ppf=1 \qquad \text{Equation 5}$$

Therefore, for example, it is possible to have a ρpf value of 10 and a ρpf value of −9, since the unity constraint is satisfied. Such a combination of weights will not necessarily result in an image that is desirable, but it is possible. Preferentially, ρcf ranges between 0.5 and 1.5 and ρpf ranges between −0.5 and 0.5, although other values can be used effectively.

If ρcf and ρpf are allowed to vary, then so too must individual weights (wcf and wpf) comprising them. In general, a set of individual weights is determined for a plurality of predetermined values of ρcf and ρpf. These individual weights are pre-stored in memory in the form of a lookup table. Therefore, using the variables that help determine the filter tap configuration, one of the plurality of individual weight sets associated with the selected values of ρcf and ρpf is selected.

For example, using the noise parameter, a particular tap configuration is selected and the values of ρcf and ρpf are 1.2 and −0.2 respectively. The individual weight comprising ρcf are as follows:

| Set 1: | wcf0 = 0.1, | wcf1 = 0.5 and | wcf2 = 0.6 |
|---|---|---|---|
| Set 2: | wcf0 = 0.4, | wcf1 = 0.4 and | wcf2 = 0.4 |
| Set 3: | wct0 = 0.6, | wcf1 = 0.5 and | wcf2 = 0.1 |
| Set 4: | wcf0 = 0.5, | wcf1 = 0.1 and | wct2 = 0.6 |

Therefore, if pixel 1 is noisier than the other pixels, set 1 is selected. If pixel 2 is noisier than the other pixels, set 4 is selected. If pixel 3 is noisier than the other pixels, set 3 is selected. Finally, if all pixels are roughly equivalent, set 2 is selected. Both interlaced image sequence filters and progressive scan image sequence filters depend on inter-field changes in luminance, chrominance and hue, noise, surface variability, and image structure.

Interpolating an image typically means that the image is being enlarged. Enlarging the image means that a target pixel is generated between source pixels. The position of the target pixel relative to the source pixel is referred to as the phase, denoted Φ. In general, the coefficients used to weight the source pixels for determining the target pixel are phase dependent. Therefore, wcf=wcf(Φ) and wpf=wpf(Φ).

Figure 4:
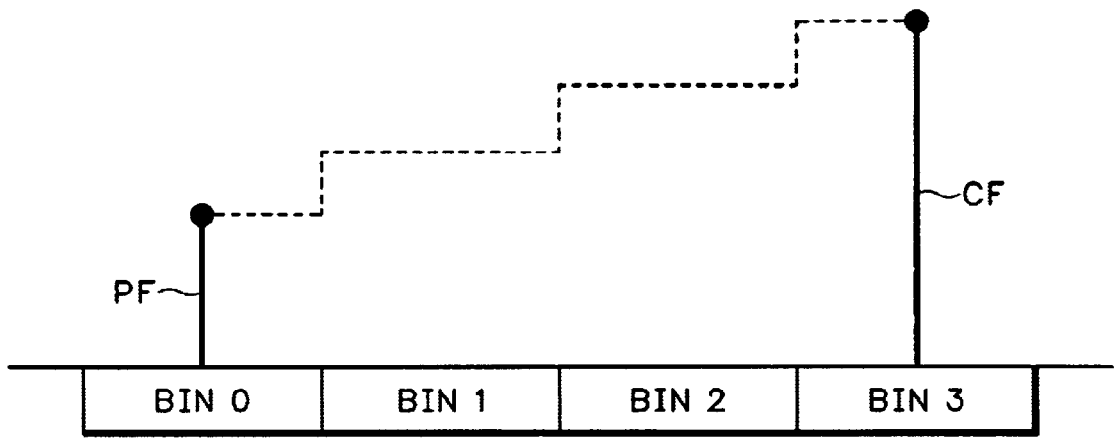
FIG. 4 is

Further, since a plurality of source pixels is typically used to create the target pixel, the filter weights are typically poly-phase and, for each phase, ρ sums to unity. Referring to FIG. 4 an example of a 4-phase system is shown for the current field of the following system:

| Phase 0: | ρcf(0) = 1.2 and | ρpf(0) = −0.2 |
|---|---|---|
| Phase 1: | ρcf(1) = 0.7 and | ρpf(1) = 0.3 |
| Phase 2: | ρcf(2) = 0.3 and | ρpf(2) = 0.7 |
| Phase 3: | ρcf(3) = 0.2 and | ρpf(3) = 0.8 |

Note that for each phase, ρcf and ρpf sum to unity.
Estimated Motion

Adaptive motion compensation is method that estimates the amount of motion present in a sequence of images. While adaptive motion compensation is not a precise measure of the amount of motion in a sequence of images, it is sufficient for providing a deinterlacing strategy that takes advantage of both current and previous field processing. Alternate methods for measuring motion, such as block matching may also be used, but are more computationally expensive in terms of both memory and processing requirements.

Adaptive motion compensation utilizes inter-field motion content for producing a deinterlaced image for viewing on a progressive scan display that suffers fewer artifacts than using either field meshing or line doubling. The inter-field motion content is a parameter defining the relative motion between the adjacent and current fields.

A logical motion estimation unit estimates where the image is static and where it is not. If a collection of pixels is static, then the algorithm works to mesh the static pixels in the current and previous field to create a progressive image, but only in the neighborhood of the static portion of the image. When it is determined that the current or previous field pixels are not static, then the pixels are deinterlaced using an approach that weights the current and previous fields in an adaptive manner.

Using ΔFe and ΔFo (as previously described), the estimated degree of motion in an image scene is determined using several inequalities. For example, a series of thresholds ($Ts_0$, $Ts_1$) . . . $Ts_N$) is used for determining the degree of inter-field motion in either the current or previous fields. The thresholds are user-defined such that $Ts_0 < Ts_1 < \ldots Ts_N$. The degree of motion for the even fields is determined by comparing the absolute value of ΔFe to The threshold values, starting from $Ts_0$. The comparison is repeated for incrementing threshold values until the threshold value is larger than ΔFe. The last threshold value that satisfies the comparison, that is, the largest threshold value smaller than ΔFe, provides a measure of The estimated degree of motion of the field. The estimated degree of motion for the odd fields is determined in a similar manner. If, for example, there is a large amount of motion detected, ρcf is emphasized over ρpf since there is a greater difference between the current and alternate fields than if there was little motion.
Image Intensity, Colour, and Hue Adaptive luminance compensation (ALC) is an approach to deinterlacing that adjusts the weights in the current and the previous fields according to the luminance, and the change in luminance in the current and previous fields as well as the motion information.

Typically, the luminance is moved away from the current field luminance when the current and previous fields are alternatively black and white. As previously mentioned, the more motion that is detected, the more preferable it is to stress the current field. However, in order to minimize a ghost effect that results from over-compensating the current field, the change in luminance should be considered. For example, consider the effective target pixel value for the following values of the current field and previous fields.

If, for example, the intensity in the current and the alternate fields is 150 and 50 respectively, and ρcf and ρpf are 1.2 and −0.2 respectively, then the intensity of the target pixel is 170. If, however, the intensity in the current and the alternate fields is 50 and 150 respectively, then the intensity of target pixel is 30. Therefore, the intensity of the target pixel deviates from the intensity of the current field significantly due to asymmetry in ρcf and ρpf. ALC examines the intensity in the current and alternate field pixels and compensates for the asymmetry in an adaptive manner. As previously mentioned, a lookup table is employed to choose a different set of weights based on the respective intensities in the current and alternate fields.

When the current field is dark and the previous field is light the resulting pixel value due to a current and previous field contribution of 1.2 and −0.2 results in either a darkening or lightening of the processed image. However, when the current field is darker than the previous field, a lighter ghost is introduced in the image and visa versa. This can inadvertently change the local contrast in the deinterlaced image.

Filter weights in the current and previous fields are selected from predefined criteria including cut off frequency and passband ripple, as well as temporal characteristics such as rise time and overshoot. The heuristics unit examines properties in the region of interest and provides a recommendation for the best configuration according to the predefined criteria as described below.

In an alternate embodiment, the system and method as described above may be applied to a progressive scanned image. Various modifications for accomplishing this will be apparent to a person skilled in the art. These modifications include the omission of motion compensation and adaptive luminance compensation, since the lines in a progressive scanned image are not temporally displaced while in an interlaced image they are temporally displaced.

In yet an alternate embodiment, the system and method as described above may be applied to a further algorithm for filtering and resizing images. The present embodiment is particularly useful for resizing high contrast images such as computer-generated images, web pages and computer graphics with text. The algorithm is referred to as the adaptive nearest neighbor (ANN) algorithm, which is a non-linear algorithm for examining surface structure in order to compute a target pixel.

The ANN algorithm is a separable process that examines surface structure, such as edges and lines, in the region of interest. As previously described, information from the difference generator is used for determining structures within the image. The ANN algorithm performs two functions. First, it preserves the energy in the portion of the image containing a visibly significant structure by filtering. Second, it preserves some of the structure in the image by retaining a sharp edge such that the contrast is not unduly effected.

Figure 10:
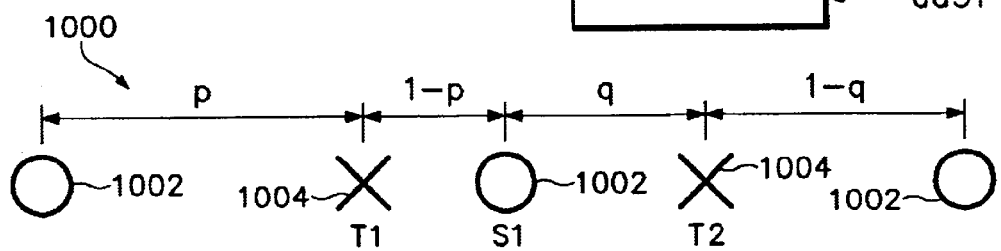
FIG. 10 is a schematic diagram of sample pixel arrangement for providing an implementation of an adaptive nearest neighbour algorithm.

Referring to FIG. 10 an example of a pixel arrangement is illustrated generally by the numeral 1000 for providing a sample implementation of the ANN algorithm. Three source pixels 1002 and two target pixels 1004 are shown.

During image enlargement (or reduction) target pixels are placed about source pixels. Due to the fact that the step size is less than the distance between source pixels, there are two target pixels bounding a source pixel. This is true because separable interpolation in the vertical and horizontal directions forces the interpolated target pixel to be collinear with the rows (when interpolating horizontally) and collinear with the columns (when interpolating vertically). The target pixel nearest to the source pixel containing an edge, corner, or structure of significance, as determined by the difference generator, is used to preserve the edge. The subsequent target pixel is computed using a desired filtering technique. Preferably, the desired filtering technique is that described above. Alternately, other filtering techniques, including proprietary techniques and those known in the art, may be used.

Referring once again to FIG. 10, target pixel T1 is closer to source pixel S1 than target pixel T2 is to source pixel S1. Therefore, the ANN algorithm sets T1 equal to S1 and T2 is computed using the desired filtering technique. It will be understood that this process works for both horizontal and vertical interpolation.

Determining which target pixel is nearest to the source pixel is accomplished using the following rules:
1. If 1−p<q then T1 is nearest to S1 so T1 is set to S1 and T2 is filtered.
2. If 1−p>q then T2 is nearest to S1 so T2 is set to S1 and T1 is filtered.
3. If 1−p=q and if the preference is Prior then T1 is set to S1 and T2 is filtered.
4. If 1−p=q and if the preference is not Prior then T2 is set to S1 and T1 is filtered.

The Prior preference flag is used in case neither T1 nor T2 is nearest to S1. As we desire only one of either T1 or T2 to acquire the characteristics of S1, we use a user-defined Prior preference flag to resolve the ambiguity.

It is possible to transfer this information into a lookup table. Therefore, based on the fractional value of the current pixel location, that is, its phase, it can be determined whether T1 or T2 is nearest to S1. The following table is an example of encoding the rules given above in a table for a given step size. The second column indicates the fractional portion of the target pixel location. The third column indicates whether the target pixel is the nearest possible target pixel to the source pixel to its immediate left (or above). The fourth column indicates whether the target pixel is the nearest possible pixel to the source pixel to its immediate right (or below).

| Phase | Region | Nearest to Left Source | Nearest to Right Source |
|---|---|---|---|
| 0 | [0,0] | True | True |
| 1 | (0,4/16) | False | True |
| 2 | [4/16,12/16] | False | False |
| 3 | (12/16,1) | True | False |

Nearest Source pixel look-up table for target pixel determination in the Adaptive Nearest Neighbor for a step size of 025.

As previously described, logic examines the directional differences between pixels, horizontally, vertically and diagonally, to determine whether an edge is present, or any other structure of interest.

A table hook-up is used based on the preserve one side of a high-contrast defining feature. In particular, it preserves the edge nearest to the target pixel via nearest neighbor and filters on the other side. This requires phase look ahead and phase look back circuitry in order to determine how to compute the target pixel nearest to the high contrast region. For example, for interpolating across an edge there are two candidate target pixels that surround the edge. The target pixel nearest to the edge pixel will be determined by a nearest neighbor rule. The other target pixel will be computed using filtering. ANN works well for scaling factors greater than 1.

There is no need to tag pixel information during vertical scaling to aid in the decision making process during horizontal scaling.

The terms and expressions which have been employed in the specification are used as terms of description and not of limitations, there is no intention in the use of such terms and expressions to exclude any equivalents of the features shown and described or portions thereof, but it is recognized that various modifications are possible within the scope of the claims to the invention.

The embodiments of the invention in which an exclusive property or privilege is claimed are defined as follows:

1. A method of calculating a target pixel for scaling an image comprising a plurality of source pixels, said method including the steps of:
    (a) determining a contour in said image using at least one of a first set of predetermined parameters;
    (b) adaptively selecting a filter tap configuration from a predefined set of filter tap configurations in accordance with said determined contour, said predefined set of configurations including a plurality of non-linear filter tap configurations; and
    (c) calculating said target pixel by selectively convolving ones of said plurality of source pixels along a locus of said selected filter tap configuration with a weighting factor, and combining said convolved pixels.

2. A method as defined in claim 1 wherein said weighting factor for each of said ones of said plurality of source pixels is calculated in accordance with a second set of predetermined parameters.

3. A method as defined in claim 1 wherein said first set of predetermined parameters includes pixel noise, background intensity, image intensity, colour, hue, and surface direction.

4. A method as defined in claim 1 wherein said image is interlaced.

5. A method as defined in claim 1 wherein said image is non-interlaced.

6. A method as defined in claim 4 wherein said second set of predetermined parameters includes pixel noise, background intensity, image intensity, colour, hue, surface direction, inter-field motion, and inter-field luminance.

7. A method as defined in claim 5 wherein said second set of predetermined parameters includes pixel noise, background intensity, image intensity, colour, hue, and surface direction.

8. A system for calculating a target pixel for scaling an image comprising a plurality of source pixels, said system comprising:
    (a) a plurality of calculation units for calculating values for a first set of predetermined parameters;
    (b) a filter selector for selecting a filter tap configuration from a set of filter tap configurations in accordance with said first set of predetermined parameters, said set of filter tap configurations including non-linear filter tap configurations;
    (c) a convolution unit for convolving selected ones of said plurality of source pixels along a locus of said selected filter tap configuration with predetermined weighting factors; and
    (d) an output for combining said convolved pixels for calculating said target pixel.

9. A method of scaling an image comprising a plurality of source pixels, said method including the steps of:
    (a) determining a contour in said image using at least one of a set of predetermined parameters;
    (b) selecting a first target pixel, said first target pixel being a target pixel closest to said determined contour;
    (c) setting said first target pixel equivalent to a closest source pixel on said contour; and
    (d) filtering said plurality of source pixels for determining a second target pixel.

10. A method as defined in claim 9 wherein said image is a high contrast image.

11. A method as defined in claim 10 wherein said high contrast image includes computer-generated images, web pages, and computer graphics with text.

* * * * *

UNITED STATES PATENT AND TRADEMARK OFFICE
CERTIFICATE OF CORRECTION

PATENT NO. : 6,788,353 B2
DATED : September 7, 2004
INVENTOR(S) : Wredenhagen et al.

It is certified that error appears in the above-identified patent and that said Letters Patent is hereby corrected as shown below:

<u>Drawings</u>,
Figure 7, left side, "24b" should read -- 724b --.

<u>Column 1</u>,
Line 45, "with The even" should read -- with the even --.

<u>Column 2</u>,
Line 3, "create The output" should read -- create the output --.
Line 65, "FIG. 4 is" should read -- FIG. 4 is an example of a 4-phase system. --.

<u>Column 4</u>,
Line 2, "scaled, The" should read -- scaled. The --.

<u>Column 7</u>,
Line 20, "Referring To FIG. 6," should read -- Referring to FIG. 6, --.
Line, 32, "configuration c13" should read -- configuration c13 --.

<u>Column 8</u>,
Line 54, "configuration That is," should read -- configuration. That is, --.

<u>Column 10</u>,
Line 39, "configuration, Let" should read -- configuration. Let --.
Line 48, Equation 1, "Target $cf_0$" should read -- Target = $cf_0$ --.
Line 53, Equation 2, "+$wcf_3$+$wcf_0$+$wcf_1$+$cf_2$= ρ" should read
-- +$wcf_3$+$wpf_0$+$wpf_1$+$wpf_2$= ρ --.

<u>Column 11</u>,
Line 11, Equation 3, "+wcf3 = pcf" should read -- +wcf3 = ρcf --.
Line 13, Equation 4, "+$wpf$1 = wpf" should read -- wpf1+wpf2 = ρpf --.
Line 16, Equation 5, "$pcf$+$ppf$ = 1" should read -- ρcf+ρpf = 1 --.
Line 17, "a ppf value" should read -- a ρcf value --.
Line 44, "Set 3: wct0 = 0.6," should read -- Set 3: wcf0 = 0.6, --.
Line 45, "wct2= 0.6" should read -- wcf2 = 0.6 --.

<u>Column 12</u>,
Line 36, "($TS_0$, $TS_1$) ..." should read -- "($TS_0$, $TS_1$, ... --.
Line 45, "of The estimated" should read -- of the estimated --.

UNITED STATES PATENT AND TRADEMARK OFFICE
CERTIFICATE OF CORRECTION

PATENT NO. : 6,788,353 B2
DATED : September 7, 2004
INVENTOR(S) : Wredenhagen et al.

It is certified that error appears in the above-identified patent and that said Letters Patent is hereby corrected as shown below:

Column 13,
Line 50, "filtering, Second," should read -- filtering. Second, --.
Line 66, "edge, comer, or" should read -- edge, corner, or --.

Column 14,
Line 53, "table hook-up is" should read -- table look-up is --.

Signed and Sealed this

Twenty-eighth Day of June, 2005

JON W. DUDAS
*Director of the United States Patent and Trademark Office*